United States Patent

[11] 3,577,957

[72] Inventor Henry Sandig
 38 Park Row, New York, N.Y. 10038
[21] Appl. No. 856,357
[22] Filed Sept. 9, 1969
[45] Patented May 11, 1971

[54] ANIMAL FEEDER HAVING ADJUSTABLE TIMING MEANS
 3 Claims, 3 Drawing Figs.
[52] U.S. Cl. .................................................. 119/51.11,
 119/56, 222/70, 119/51.5
[51] Int. Cl. .......................................................... A01k 05/02
[50] Field of Search ............................................ 119/51,
 51.11, 56, 51.5; 222/70, 379

[56] References Cited
 UNITED STATES PATENTS
3,376,856 4/1968 Crippen ........................ 119/51.11X
3,421,479 1/1969 Fleming ........................ 119/51.11

Primary Examiner—Aldrich F. Medbery
Attorney—Charles E. Temko

ABSTRACT: An automatic animal feeder comprising upper and lower container elements, the upper container element being adapted to contain food, the lower container element containing a meltable solid or solids and having drainage means for the resultant melted fluid after said solids have melted. Resilient means urge the containers into mutually telescoped relation. Each container includes an opening alignable with an opening in the other container to provide a passage through which food may be discharged, whereby with the melting of the meltable solids in the lower container and melting fluid discharged therefrom, the lightening of the effective weight and the diminishing of the space between the containers permits the resilient means to progressively telescope the container elements to align the openings for this purpose.

PATENTED MAY 11 1971    3,577,957
Fig.1
Fig.2
Fig.3
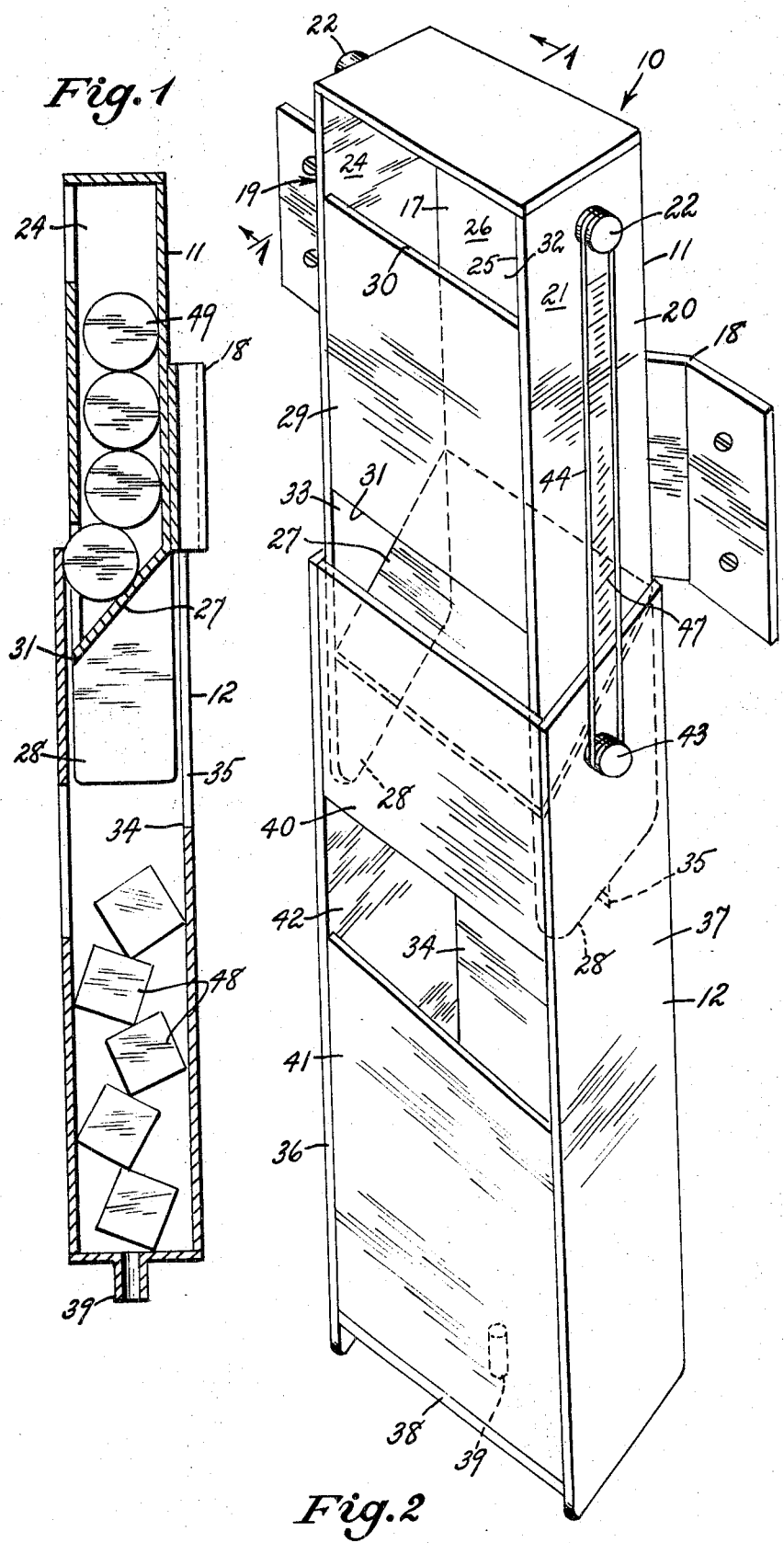
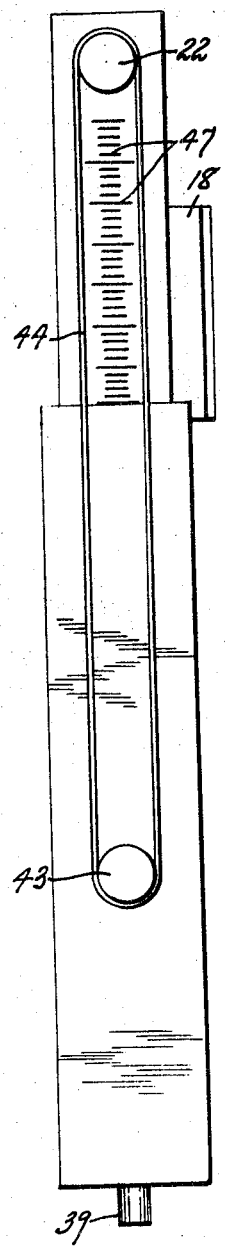

ANIMAL FEEDER HAVING ADJUSTABLE TIMING MEANS

This invention relates generally to the field of animal feeding devices, and more particularly to an improved device incorporating a means for the automatic dispensing of food at a predetermined time.

It is a principal object of the invention to provide a simple and efficient device for feeding animals from a level not accessible to the animals by wall mounting the device at a height out of reach of the specific animal, thus keeping the entire device and the contents thereof in undisturbed condition until a predetermined period of time has elapsed, following which the amount of food intended for the animal is discharged.

Another object of the invention lies in the provision of an animal feeding device having adjustable means for predetermining the specific time for food discharge.

Yet another object of the invention lies in the provision of an animal feeder utilizing the force of gravity to discharge food and to otherwise operate the device.

A further object of the invention lies in the provision of an improved animal feeding device of the class described, in which the cost of fabrication may be of a reasonably low order, thereby permitting consequent wide sale, distribution and use.

Still another object of the invention lies in the provision of an automatic feeding device which will use melting ice or other solids as a means of timing the predetermined period prior to the discharge of food.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a longitudinal central sectional view of an embodiment of the invention, as seen from the plane 1-1 in FIG. 2.

FIG. 2 is a perspective view of the embodiment.

FIG. 3 is a side elevational view thereof.

In accordance with the invention, the device, generally indicated by reference character 10, comprises broadly: an upper container element 11 and a lower container element 12. Most conveniently, the device may be formed principally by injection molding of synthetic resinous materials or other plastics, although, where desired, it may be formed of sheet metal, metal castings or stampings, or fabricated entirely from wood or similar materials.

The upper container element 11 includes a rear wall member 17 to which a bracket mounting means 18 is secured, thus permitting the device to be suspended from a vertical surface such as a wall (not shown). Interconnected to the rear wall member 17 are sidewalls 19 and 20, the outer surfaces 21 of which are provided with knobs 22. The inner surfaces 24, 25 and 26 of the rear wall 17 and sidewalls 19—20 support an angularly disposed lower bottom floor wall 27 disposed above the lower edges 28 of the sidewalls 19—20. A forward wall 29 interconnects the forward edges of the sidewalls 19—20, and includes an upper free edge 30 and a lower free edge 31 defining an upper opening 32 and a lower opening 33, respectively.

The lower container element 12 is sized to permit the same to fit over and telescope with respect to the upper container element 11, and includes a rear wall 34 having a cutout portion 35 to permit it to clear the bracket 18. Sidewalls 36 and 37 are interconnected with a lower bottom floor wall 38 having a drain opening 39. An upper forward wall 40 and a lower forward wall 41 define a rectangular opening 42. Adjacent to the upper end of the sidewalls 36—37 are knobs, one of which is indicated by reference character 43. A pair of contractile bands 44, which may be of rubber, elastic or in the form of coil springs, interconnect the knobs 43 with the knobs 22 on each side of the device, and in relatively unstressed condition position the opening 42 opposite the lower opening 33 in the upper container element 11.

Operation of the device is commenced by manually pulling the lower container element 12 downwardly to the required degree as indicated by a time scale 47 (FIG. 3). A quantity of ice 48 or other meltable solids is then inserted through the opening 42 sufficient to maintain the lower container element 12 in the desired position against the action of the bands 44. In such lowered position, the lower opening 33 is at least partially closed, and a quantity of food 49, preferably of round or cylindrical shape may then be introduced into the upper opening 32 to be retained within the upper container element.

As the ice melts, water collects on the lower bottom floor wall 38 to be drained through the opening 39. As the distance between the upper container and the lower container element progressively lessens and the volume of the space between the containers diminishes, the contractile effect of the bands 44 telescopes the upper and lower container elements to a point where the opening 33 is aligned with the opening 42, and the food to be eaten by the animal passes therethrough to fall upon a floor or container positioned beneath the device.

Where desired, a small pan (not shown) may be placed or wall hung beneath the drain opening 39 to collect water melted, so that it does not dampen the floor upon which the food will fall and will provide water for the animal to drink.

I wish it to be understood that I do not consider the invention limited to the precise details of structure shown and set forth in this specification, for obvious modifications will occur to those skilled in the art to which the invention pertains.

I claim:

1. An automatic animal feeding device comprising: an upper food container element defining a first chamber, there being a discharge opening in said chamber; a lower container element defining a second chamber, said upper container element being slidably engaged with said lower container element to be telescoped therein; said lower container element having an opening therein selectively alignable with said discharge opening in said first container element defining a food dispensing means; resilient means interconnecting said first and second container elements tending to move the same together in a direction to align said openings; said second container and the bottom of said first container defining a closed variable size space for receiving a diminishing volume spacing means, and a fluid drainage means adjacent a lower end of said second chamber; whereby, upon the placing of a quantity of a meltable solid within said lower chamber, and the melting thereof over a period of time, said resilient means may progressively urge said openings in said upper and lower container elements into alignment to permit the gravity discharge and dispensing of a quantity of food placed in said upper container element.

2. Structure in accordance with claim 1, in combination with a meltable solid.

3. Structure in accordance with claim 2, in which the meltable solid is ice.